Feb. 4, 1941. J. J. GOUGH 2,230,488
BUN WARMER
Filed April 24, 1939
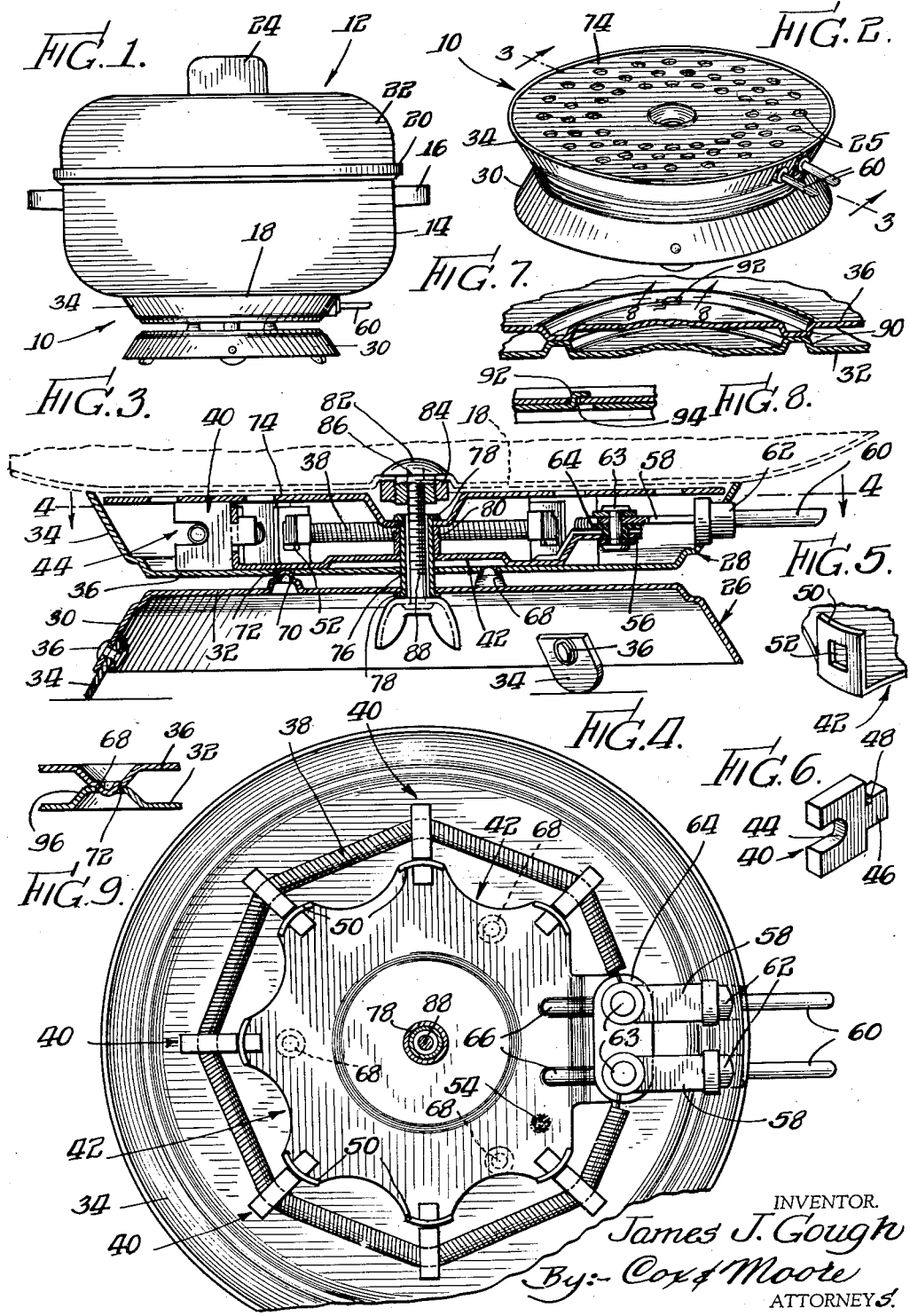
INVENTOR.
James J. Gough
By:- Cox & Moore
ATTORNEYS.

Patented Feb. 4, 1941

2,230,488

UNITED STATES PATENT OFFICE 2,230,488

BUN WARMER

James J. Gough, Chicago, Ill., assignor to Chicago Electric Manufacturing Company, Chicago, Ill., a corporation of Illinois Application April 24, 1939, Serial No. 269,636

10 Claims. (Cl. 219—19)

The present invention relates to an electrical device and more particularly to a warming and heating unit for use as a domestic appliance.

It has been the practice to maintain rolls, breads and buns in a warm condition for serving by suitably enclosing such foodstuffs as they come from a warming oven, in order to retain residual heat until such time as the articles are to be served. Employing metallic containers for this purpose, the loss of heat by the container is relatively repaid so that if permitted to remain upon a table for any extended period of time the rolls will nevertheless lose their warm condition. The present invention contemplates the provision of an improved warming or heating unit for cooperation with a container of the foregoing character which will not only positively maintain the foodstuff in warm or hot condition, as desired, but which may be employed for heating and warming purposes on the table so that hot rolls and breads may be served from the table at any time in hot condition.

It is an object of the present invention to provide a warming unit which is relatively small and of extremely simple construction and suitable for use directly upon the table in association with any suitable type of bread or roll container. In this connection the present invention particularly comprehends the provision of a unit adapted to direct the heat upwardly into association with the parts to be warmed, while maintaining the lower or supporting base portion relatively cool, whereby the present construction may be employed without detriment upon table or other supporting surfaces which might be easily damaged by heat. To this end, in accordance with the present invention, the heating unit is mounted in a housing spaced above a lower or base housing constructed to rapidly dissipate such small amount of heat as may be radiated or conducted thereto and having relatively non-conductive foot or base portions.

It is a further object of the present invention to provide a bun or roll warming unit which is directly associable with a suitable containing vessel, either temporarily or permanently, by a simple attachment means so as to provide a unit readily removable from the vessel or container when the container is to be cleaned or stored.

An additional object of the present invention is to provide a bun warmer construction as above and comprising an electrical heating unit wherein a heating unit is mounted upon and supported by suitable refractory units having interlocking engagement with a suitable supporting frame such that the refractory units fit freely into the frame for assembly but are positively retained when the frame is located within the finished unit.

Numerous other objects and advantages will be apparent from a consideration of the following specification when taken in connection with the accompanying drawing in which:

Figure 1 is an elevational view of the warming device constructed in accordance with the present invention and showing suitable roll container.

Figure 2 is a perspective of the warming unit shown in Fig. 1.

Figure 3 is a sectional elevational view taken centrally through the warming unit of Fig. 2 on line 3—3 thereof.

Figure 4 is a horizontal section of the same unit taken on line 4—4 of Fig. 3.

Figure 5 is a detailed perspective view of a bracket construction for receiving a refractory heater support.

Figure 6 is a perspective view of one of the refractory heater supports.

Figure 7 is a detailed perspective view showing a modified form of connecting means for joining the upper and lower portion of the warming unit, the portion under consideration being divided centrally to sectionally illustrate the internal construction to section.

Figure 8 is a sectional view taken on line 8—8 of Fig. 7.

Figure 9 is a detailed sectional view showing a yet further modified juncture and supporting construction which may be substituted for the construction shown in Fig. 7.

Referring to the drawing wherein the present invention is illustrated more in detail, Figs. 1 to 4, inclusive, disclose a roll or bun warmer designated generally by the reference numeral 10, the unit being shown in Fig. 1 in association with a suitable vessel 12 for containing rolls. The vessel 12 may be of more or less conventional construction comprising a lower portion having a cylindrical side wall 14 provided with handles 16 and a bottom wall 18. The lower member is provided with a recess or trough 20 at its upper edge to receive the upper or cover portion 22 having a handle portion 24. It will be seen that the warming unit 10 receives the container and vessel 12 in supporting relationship.

The warming unit per se, as shown more clearly in Figs. 2 and 3, comprises in general a lower or base portion 26 and an upper or heating section 28. It should be noted that the lower portion or supporting section has in general a frusto conical form provided by a conical side wall 30 and a general flat top wall 32. Supporting foot members 34, preferably of some non-conducting material, are riveted at 36 to the conical side wall at equi-distant points and extend below the wall for spacing the entire unit from the supporting surface. It is to be preferred that the lower edge of the supporting legs 34 be rounded as shown in Fig. 3.

The upper portion 28 of the warming unit comprises a frusto conical cup or housing substantially identical in general configuration with that hitherto described and having a conical wall 35 and a bottom wall 36. This portion is secured in inverted relationship to the base portion 26 by means to be hereinafter described more in detail. A coil of resistance wire 38 extends annularly within the recess formed by the conical wall 35, being mounted upon a series of supporting yokes 40 which in turn are attached to a central mounting bracket 42. The construction of each of the supporting lugs or yokes is shown more in detail in Fig. 6. Each of these members 40 comprises a block recessed as at 44 to receive the coil 38. From the opposite side of the block 40 there projects a lug 46 notched downwardly adjacent the main body of the block as at 48.

The main mounting bracket 42 as shown in detail in Figs. 3 and 4 comprises a more or less flat sheet of metal having circumferentially spaced about its periphery a plurality of upwardly extending lugs or flanges 50. Each of the flanges is apertured as at 52 (see Figs. 3 and 5) to receive the lug or projection 46 upon the blocks 40. As shown in Figs. 3 and 6, the lugs 46 extend through the apertures 52, thus fixing the several blocks 40 so that they extend radially while being arranged in an annular path about the center of the plate or mounting bracket 42. The recesses 44 face accordingly radially outwardly to receive the heating coil 38.

Attention is particularly directed to the fact that while the apertures 52 are of just sufficient height to accommodate the lug 46, nevertheless each of the lugs or projections 46 is at such an elevation on its respective block 40 that the lower edge of the block necessarily extends below the lower surface of the frame 42 as the lug is being passed through the aperture. In this connection it should be further noted (see Fig. 3) that the mounting bracket or plate 42 is secured flatwise against the lower or bottom wall 36 of the upper housing section 28. Stated in other words, the coils supporting blocks 40 cannot be removed from their apertures 52 unless the lower edges of the blocks can be displaced below the lower surface of the frame. It is clearly evident from consideration of Fig. 3, however, that with the mounting bracket 42 secured flatwise upon the wall 36 the blocks 40 rest upon the wall 36 and can never be displaced downwardly below the top surface of this wall. Therefore, in operative position the blocks can under no circumstances be moved downwardly from the apertures 52. The function of the grooves or notches 48 will thus be clearly evident since in the position shown in Fig. 3 the notches 48 receive the material adjacent the upper edge of the aperture 52 and thus cause a positive interengagement between the blocks and their supporting frame.

The present construction is of great practical significance from the standpoint of simplicity of construction and assembly since it is an extremely simple matter to freely insert the lugs 46 into the several apertures and then merely to place the assembly flatwise upon the supporting wall 36 as shown in Figs. 3 and 4, and then to permanently join the parts by means, i. e., of a spotweld 54. As pointed out above, it is to be preferred that the supporting units 40 be formed of any suitable heat resistant or refractory material, although it would be obvious that this is not a necessity in view of the fact that the present device may be designed to have only a moderate heating capacity.

The centrally supported mounting bracket 42 is provided at one side with a laterally extended flange or shelf 56 spaced from the lower wall 36 of the housing and serving as a terminal supporting means for the ends of the heating element 38 and a pair of conductor strips 58. The conductor strips are integral with a pair of prongs 60 which extend outwardly through the side of the housing, as clearly shown and are protected by a pair of insulating bushings 62. Suitable fastening rivets 63 engage the inner ends of the strip conductors 58 and the ends of the resistance coil 38. Insulating washers 64 electrically separate the conductors from the supporting shelf 56 while a pair of ribs 66 additionally rigidify the supporting shelf construction.

It should be particularly noted that the upper and lower portions 28 and 26 of the warming unit are spaced through the agency of three supporting projections 68 formed upwardly from the surface 32 of the lower portion by punching or displacing material upwardly. These leg or spacing portions are shouldered as at 70 and terminate in small rounded extremities adapted to engage within aperture 72 in the superposed wall 36. Thus the supporting projections interengage the two portions of the heater to provide a three-point support for the upper section. The two portions, as well as a cover 74 for the top portion 28, are all permanently joined together as a unit by means of a central sleeve 76 which passes through central apertures in the cover 74 as well as the aforementioned horizontal walls 32 and 36 and is upset or turned over at 78 for clampingly retaining parts together. An outer or spacing sleeve 80 is interposed between the cover 74 and the bottom wall 36 of the upper heater section. The cover 74 is preferably recessed downwardly adjacent the sleeve 76 as shown in Fig. 3 for accommodating a simple fastening means upon the superposed vessel as will appear hereinafter more in detail. It will be obvious from the foregoing that the sleeve 76 permanently maintains the several parts together against axial displacement while the spacing supports 68 received by the apertures 72 relatively support and space the upper and lower sections of the heating unit while interlocking them against lateral or rotational displacement. The cover plate 74 is uniformly apertured as at 75. The heat transmitted by the supports or projections 68 is relatively small, wherefore it will be apparent that the lower section 26 will always be maintained at a substantially lower temperature when the device is in operation. Since this last-named portion of the device is further spaced from the supporting surface or table by means of the heat resistant legs 34 it will be evident that the present construction is adapted to use in substantially any situation without danger of harmful effect upon the supporting surface or table.

In use the present warming unit is located beneath and in supporting relationship to the vessel hereinbefore described, as shown in Fig. 1, or any other suitable container or vessel adapted to be warmed. The present invention comprehends the provision of means for releasably inter-associating the container and the heater so that the parts provide a rigid unit wherein the parts are not subject to accidental separation. To this end the lower wall 18 of the warming vessel indicated by the dotted lines in Fig. 3 is centrally apertured to receive a headed screw fastener 82 held in position by a nut 84. The fastener is axially bored and threaded as at 86 to receive the end of a wing screw 88. Since the threaded passage 86 is in axial alinement with the axis of the sleeve 76, the screw 88 may extend through the sleeve to engage the threaded aperture 86 as clearly shown in Fig. 3 and in this position positively secures the parts together. It will be obvious, however, from the above that the wing screw may be readily manipulated to release it from interengagement with the vessel to permit separation of the parts.

The present invention provides a very simple and effective warming device, being particularly adapted for warming foodstuffs and for maintaining their hot condition at the table. The warming device as herein disclosed is not, however, limited to the present preferred use, but may be applied extensively for warming purposes in general.

There is shown in Figs. 7 and 8 an alternative modified form of conjuncture for the upper and lower sections of the heater in place of the foregoing supporting projections 68. The walls 32 and 36 are each provided with an annular rib 90 by causing the metal to flow out of the plane of the wall in an annular path. The two ribs 90 extend into abutment as shown in Fig. 7 to space the walls 32 and 36 a predetermined distance at all other points. The lower projecting rib portion is provided with a plurality of struck out tabs 92 along its upper surface which are received by cooperating apertures 94 in the superposed annular rib. The step of merely inserting the tabs 92 in the apertures 94 and forming them over to clamping engagement provides a very simple and effective means for interconnecting the two sections of the bun warming unit.

Fig. 9 discloses yet further modified form of spacing and interlocking projection. In accordance with this illustrated construction, it will be noted that the upper wall 36 is provided with a downwardly deformed projection 68' substantially identical to the projection 68 previously described. The lower or spaced wall 32 is provided with an aperture 72' to receive the shouldered extremity of the projection 68', and in addition the material of the wall adjacent the aperture 72' is punched or deformed upwardly as at 96. The present construction provides for adequate spacing of the walls 32 and 36 without necessitating an inordinate distortion of the metal in forming the interengaging parts.

Changes may be made in the form of construction and arrangement of parts without departing from the spirit of the invention or sacrificing any of its advantages, the foregoing preferred construction having been disclosed merely for illustrative purposes to enable one schooled in the art readily to comprehend the nature of the invention. The right is therefore reserved to make all such changes as fairly fall within the scope of the following claims.

The invention is claimed as follows:

1. A bun warming unit for supporting and warming a bun receiving container, said unit comprising a base section having a top wall and downwardly extending flange, a heater section having a bottom wall and an upwardly enclosing flange providing a recess, an electrical heating element within the recess, said sections being joined together, and said top and bottom walls being substantially spaced to resist heat transmission to said base, and a sleeve extending centrally through said top and bottom walls and interengaging said sections for permanently joining said sections together while permitting free passage of a central fastening member for securing the container to the unit.

2. A bun warmer of the class described comprising a frustoconical upwardly extending base section having a top wall, a frustoconical heater section relatively inverted with respect to said base section and being spaced therefrom and having a bottom wall, and means joining said sections permanently together and providing a central passage for a fastening member adapted to releasably connect said sections to a bun receiving warming vessel.

3. In combination with a vessel or container adapted to receive rolls or buns for retaining in warm condition, a warming unit comprising a sheet metal base having a top wall and a downwardly extending marginal flange, an upper heater section having a bottom wall and an upwardly extending marginal flange providing a recess, and electrical heating means within said recess, a sleeve passing through said heater and base sections and being connected therewith to join such sections permanently together, said container having a fastening means permanently located adjacent the bottom portion and passing centrally through said sleeve to interconnect the warming unit and the container.

4. A bun warming unit of the class described comprising an electrical heating element, a housing for said element, a supporting member for supporting said heating element in the housing, a mounting member in the housing for locating the supporting member, one of said members having a portion freely longitudinally receivable by the other of said members and relatively laterally shiftable when received, complementary lateral interlocking shoulder portions on said members interengageable when the parts are shifted relatively laterally to positively resist relative withdrawal of the members, and said mounting member being fixed within the housing with means disposed in lateral contact with the supporting member and permanently laterally holding said complementary lateral interlocking means in permanent locking engagement.

5. A bun warming unit of the class described comprising an electrical heating element, a housing for said element, a supporting block member for supporting said heating element in the housing, a mounting bracket member in the housing for locating the supporting block member, said block having a projecting lug extending longitudinally therefrom, said bracket being provided with an aperture to receive the projecting lug, complementary lateral interlocking means on said members operative, when the lug and aperture are moved relatively laterally, to positively prevent relative longitudinal withdrawal of the lug from the aperture, said bracket being mounted within the housing and a portion of said housing being disposed in lateral contact with said block and permanently holding said lateral interlocking means in locking engagement.

6. A bun warming unit of the class described comprising an electrical heating element, a housing for said element, a plurality of supporting block members for supporting said heating element in the housing, mounting bracket means in the housing for locating the supporting block members, each of said blocks having a projecting lug extending longitudinally therefrom, said bracket being provided with an aperture to receive the projecting lug, complementary lateral interlocking shoulders on said member and bracket operative, when the lug and aperture are moved relatively laterally, to positively prevent relative longitudinal withdrawal of the lug from the aperture, said bracket being mounted within the housing and means disposed in lateral contact with said block and permanently holding said lateral interlocking means in locking engagement.

7. In an electrical warming device of the class described a housing, a supporting bracket within the housing and having a plurality of circumferentially spaced upwardly extending apertured flanges, a supporting block associated with each of said flanges and having an outwardly facing recess, a heating unit supported within said recess, each block having a projecting lug extending through an aperture in one of said flanges, each of said lugs being recessed at a point spaced from its extremity and said blocks being operatively supported by said housing in a position causing said recess to positively embrace an edge of the aperture to resist withdrawal.

8. An electrical heating and warming device of the class described having a lower or base section having an upper wall and a heating section having a lower wall, said sections being permanently interconnected in spaced relationship by means comprising bodily displaced supporting leg portions on one of said walls and extending toward the opposite wall, said supporting leg portions being shouldered, said opposite wall being apertured to receive said shouldered supporting leg portions for supporting the sections in spaced relationship and a fastening member embracing said sections centrally thereof and clamping said sections together to retain said supporting leg portions in interengagement with the apertures.

9. An electric heating device comprising a housing having opposed walls, an elongated heating element, a bracket between said walls and supportable on one of said walls, said bracket having flange portions extending when the bracket is supported on said wall in a direction transverse to the opposed walls, members engageable with one of the opposed walls of the housing for supporting said heating element, said members and said flange portions of the bracket having lugs and apertures freely interfitting when the bracket and members are moved in one direction, said lugs and apertures being provided with positive interlocking means operable upon relative movement of the bracket and members in another direction, said lugs and apertures being spaced different distances from the corresponding edges of the members and bracket to cause relative movement of the members and bracket in the direction to operate said positive interlocking means when said members and bracket are brought into supporting and engaging relation with said walls of the housing.

10. An electric heating device comprising a housing having opposed walls an elongated heating element, a bracket between said walls and supportable upon one of said walls, said bracket having angularly spaced arcuately disposed flange portions extending in a direction transverse to the walls when the bracket is brought into supporting relation to said one wall, members engageable with one of the said opposed walls of the housing for supporting said heating element, said members and said flange portions having lugs and apertures freely interfitting when the members and bracket are moved radially relative to the flange portions during assembly, said lugs and apertures being provided with positive interlocking means operable upon relative movement of the bracket and members in a direction axially relative to the flange portions, said lugs and apertures being spaced different distances from corresponding edges of the members and bracket to cause relative movement of the members and bracket in the axial direction relative to the flange portions to operate said positive interlocking means when said members and bracket are brought into supporting and engaging relation with said walls of the housing.

JAMES J. GOUGH.

CERTIFICATE OF CORRECTION.

Patent No. 2,230,488.   February 4, 1941.

JAMES J. GOUGH.

It is hereby certified that error appears in the printed specification of the above numbered patent requiring correction as follows: Page 1, first column, line 11, for "repaid" read --rapid--; and that the said Letters Patent should be read with this correction therein that the same may conform to the record of the case in the Patent Office.

Signed and sealed this 18th day of March, A. D. 1941.

(Seal)

Henry Van Arsdale,
Acting Commissioner of Patents.